Sept. 17, 1929. M. NAGGY ET AL 1,728,248
BUSHING REMOVING TOOL
Filed July 21, 1927
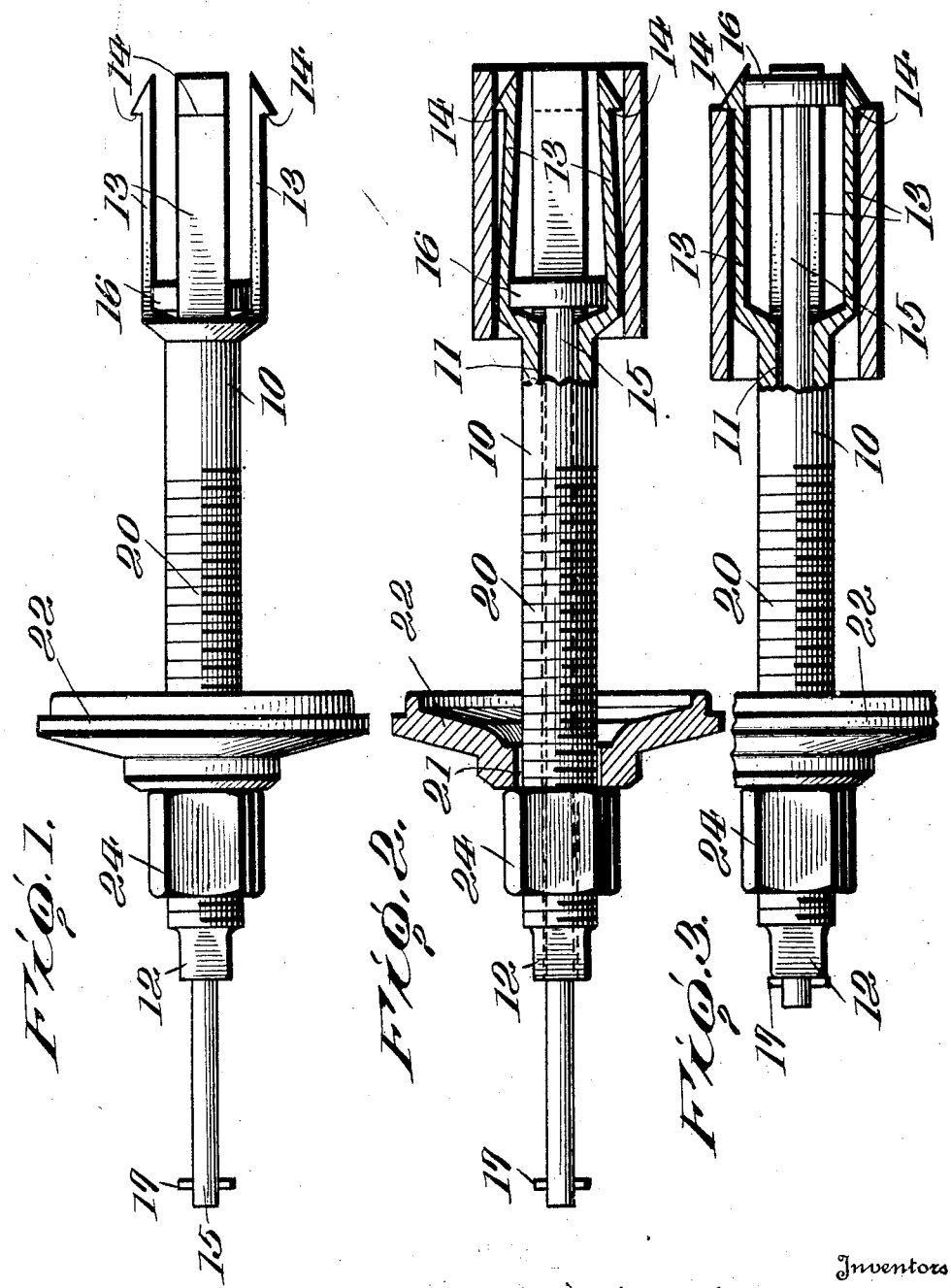

Patented Sept. 17, 1929

1,728,248

UNITED STATES PATENT OFFICE

MITCHELL NAGGY AND STANLEY SIKORSKI, OF PORT RICHMOND, VIRGINIA

BUSHING-REMOVING TOOL

Application filed July 21, 1927. Serial No. 207,519.

This invention is a device for removing drive shaft bushings of motor vehicles, but is not limited to this particular class of work.

In repairing automobiles, it is frequently very difficult to remove drive shaft bushings for replacement or other purposes, due largely to the fact that these bushings are inserted in the bearings with a driving fit, and the available working space for a bushing-withdrawing tool is very limited. One of the objects of the invention is to provide a bushing-removing device of simple construction having a head capable of being passed through the bushing to be removed, so as to engage the inner or rear end of the bushing. A further object is to provide simple means for applying a steady and continuous pulling tension to the tool so as to insure the withdrawal of the bushing.

The invention will be hereinafter fully set forth and particularly pointed out in the claims.

In the accompanying drawing:—

Figure 1 is a side elevation illustrating a bushing-removing tool constructed in accordance with the invention. Figures 2 and 3 are longitudinal sectional views illustrating the parts in different positions.

Referring to the drawing, 10 designates a tool shank which is provided with a longitudinal bore 11, one end of said shank having a flattened portion 12. The other end of the shank is provided with a plurality of spring arms 13, the extremities of which are provided with shoulders 14.

Slidably mounted in the bore 11 is a rod 15, provided at one end with a head 16 so positioned as to be enclosed by the arms 13, while adjusted within the limits of normal adjustment of said rod. The other end is provided with a stop 17.

The shank 10 is screw threaded, as indicated at 20, and is passed through an opening 21 in an abutment member 22. Said abutment member is provided with a hub portion slidably mounted on the shank 10. The end of the shank 10 which extends through the opening 21 is engaged by a nut 24.

In practice, when it is desired to remove a bushing, the head 16 is first withdrawn to the position shown in Figure 2, to permit the said arms 13 to spring inwardly, and the said arms are then passed forwardly through the bushing until the shoulders 14 snap back of the inner end of said bushing. The rod 15 is then moved to the position illustrated in Figure 3, so that head 16 will prevent collapse of the spring arms 13, and stop 17 will engage the adjacent end of the shank. After this engagement has been secured, the abutment member 22 is moved along shank 10 until it rests against the housing, so that the shank 10 extends through the opening 21. The nut 24 is then engaged with the shank. Obviously, as the nut is rotated, a pulling tension is exerted upon the shank 10, moving it in a longitudinal direction, and by reason of the engagement of the members 13 with the bushing, the said movement of the shank gradually withdraws the bushing from the bearing.

The advantages of the invention will be readily apparent to those skilled in the art to which it belongs. It will be particularly noted that the tool may be easily positioned so as to engage the bushing to be removed, and that a steady continuous pull may be exerted upon it while it is so engaged. It will also be observed that the parts are so constructed that the bushing-engaging members, after they are once engaged with the bushing, will not become accidentally disengaged, and therefore the bushing is always subjected to the maximum pulling power exerted upon the shank.

It is to be understood that the dimensions shown in the drawing have been selected for illustrative purposes only, and that said dimensions may be varied without departing from the spirit of the invention, to conform to the bushings of different sizes and of different makes of automobiles.

Having thus explained the nature of the invention and described an operative manner of constructing and using the same, although without attempting to set forth all of the forms in which it may be made, or all of the forms of its use, what is claimed is:—

1. A tool of the character described comprising a shank having bushing-engaging members at one end thereof, said members being resilient so that they may spring inwardly while being passed through a bushing to engage the far end thereof, means wholly enclosed by said members for preventing inward movement of said members after engagement with a bushing, said means being movable to a position enclosed by said members so as to prevent relative movement of the members, and means for exerting a pulling tension upon said shank.

2. A tool of the character described comprising a shank having a longitudinal bore, resilient bushing-engaging members at one end of said shank, a rod slidably mounted in said bore and having a movable head located within the space enclosed by said bushing-engaging members, means limiting movement of said head within the space enclosed by said members and means for exerting a pulling tension on said shank.

3. A tool of the character described comprising a shank provided at one end with a plurality of resilient bushing-engaging arms, a member adjustably mounted in the space enclosed by said arms to control the extent of inward movement of the arms, movement limiting means for maintaining said member within said space, and means for exerting a pulling tension on said shank.

4. A tool of the character described comprising an abutment member having an opening, a threaded shank having one end extended through said opening, resilient bushing-engaging members positioned at one end so that they may be passed through a bushing to engage the far end thereof, a head limiting inward movement of said members, and means limiting the movement of the head to the space enclosed by said members and a nut engaging the threaded portion of said shank and positioned to react against said abutment member.

5. A tool of the character described comprising a shank, a bushing-engaging member slidably mounted upon said shank and having expansible arms, said shank having an expanding member reciprocably mounted within the space surrounded by said arms, and means for imparting longitudinal movement to said bushing engaging member and said shank so as to maintain said expanding member in its arm expanding position during the bushing withdrawal operation.

In testimony whereof we have hereunto set our hands.

MITCHELL NAGGY.
STANLEY SIKORSKI.